/

US007011102B2

(12) United States Patent
Folkers

(10) Patent No.: US 7,011,102 B2
(45) Date of Patent: Mar. 14, 2006

(54) CONTAINED PIPELINE SYSTEM WITH BRINE FILLED INTERSTITIAL SPACE AND METHOD FOR DETECTING LEAKAGE IN SAME

(75) Inventor: Joie L. Folkers, Houston, TX (US)

(73) Assignee: Ameron International Corporation, Pasadena, CA (US)

( * ) Notice: Subject to any disclaimer, the term of this patent is extended or adjusted under 35 U.S.C. 154(b) by 279 days.

(21) Appl. No.: 10/641,808

(22) Filed: Aug. 15, 2003

(65) Prior Publication Data

US 2004/0035464 A1   Feb. 26, 2004

Related U.S. Application Data

(60) Provisional application No. 60/405,377, filed on Aug. 23, 2002.

(51) Int. Cl.
*F16K 37/00* (2006.01)
(52) U.S. Cl. .............. 137/15.11; 137/312; 137/558; 73/40; 73/40.5 R; 138/104
(58) Field of Classification Search ........... 137/15.11, 137/312, 558; 138/104, 112, 113; 73/40, 73/40.5 R
See application file for complete search history.

(56) References Cited

U.S. PATENT DOCUMENTS

| 4,848,456 | A |   | 7/1989  | Kilbarger |            |
|-----------|---|---|---------|-----------|------------|
| 4,939,833 | A |   | 7/1990  | Thomas    |            |
| 5,091,716 | A | * | 2/1992  | Nelson et al. | 73/40.5 R |
| 5,096,087 | A |   | 3/1992  | Thomas    |            |
| 5,172,584 | A |   | 12/1992 | Thomas    |            |
| 5,263,794 | A |   | 11/1993 | Webb      |            |
| 5,265,465 | A |   | 11/1993 | Thomas    |            |
| 5,271,518 | A |   | 12/1993 | Webb      |            |
| 5,297,896 | A | * | 3/1994  | Webb      | 73/40.5 R  |
| 5,346,625 | A |   | 9/1994  | Webb      |            |
| 5,366,318 | A |   | 11/1994 | Brancher  |            |
| 5,398,976 | A |   | 3/1995  | Webb      |            |
| 5,911,155 | A |   | 6/1999  | Webb      |            |
| 5,992,217 | A |   | 11/1999 | Jax et al.|            |
| 6,026,862 | A |   | 2/2000  | Friedrich et al. |     |
| 6,029,505 | A |   | 2/2000  | Webb      |            |
| 6,032,699 | A |   | 3/2000  | Cochran et al. |       |
| 6,116,817 | A |   | 9/2000  | Osborne   |            |
| 6,171,025 | B1 |  | 1/2001  | Langner et al. |       |
| 6,315,497 | B1 |  | 11/2001 | Wittman et al. |       |
| 6,823,886 | B1 | * | 11/2004 | Bravo et al. | 137/312 |
| 6,848,464 | B1 | * | 2/2005  | Ransom    | 137/312    |
| 2004/0234338 | A1 |  | 11/2004 | Monroe et al. |    |

* cited by examiner

*Primary Examiner*—Kevin Lee
(74) *Attorney, Agent, or Firm*—Christie, Parker & Hale, LLP

(57) ABSTRACT

A contained pipeline and leak detection system having a plurality of pipeline sections adjoined to one or more fluid reservoirs, and a method of detecting leakage in the system are provided. Each pipeline section includes a primary pipeline section and a secondary pipeline section disposed around the primary pipeline section, defining an interstitial space therebetween. The pipeline sections are adjoined by a fitting that maintains fluid communication between the primary and secondary pipeline sections, and the interstitial spaces. Fluid is disposed within the interstitial spaces and the fitting such that fluid entering or exiting the interstitial spaces or the fitting, changes the volume of fluid in the fluid reservoir. An alarm system is connected to the fluid reservoir having a sensor that detects changes in the volume of fluid in the fluid reservoir.

17 Claims, 8 Drawing Sheets

CONTAINED PIPELINE SYSTEM WITH BRINE FILLED INTERSTITIAL SPACE AND METHOD FOR DETECTING LEAKAGE IN SAME

CROSS-REFERENCE TO RELATED APPLICATIONS

This application claims the benefit of U.S. Provisional Patent Application No. 60/405,377, filed on Aug. 23, 2002.

FIELD OF THE INVENTION

This invention relates to a contained pipeline system and, more particularly, to a contained pipeline system with a brine filled interstitial space characterized by a low annular volume for use with a continuous leak detection monitoring system, and a method of detecting leakage in such system.

BACKGROUND

Double containment pipelines are in common use for transporting contaminants and toxins underground. They are commonly used as underground gasoline transporting pipelines. A double containment pipeline section is in essence a pipeline section within a pipeline section. An inner or primary pipeline section is the primary carrier of the fluids while the outer or secondary pipeline section is used to contain any leakage from the primary pipeline section. An annulus or interstitial space is formed between the primary and secondary pipeline sections. Typically, double containment pipeline sections are formed by slipping a secondary pipeline section over the primary pipeline section. The secondary pipeline section is typically the next largest size after the primary pipeline section.

Slipping one pipeline section over the other is a cumbersome, time consuming process because the primary pipeline section is formed separately from the secondary pipeline section and then the two are put together. Moreover, this approach is not conducive to forming double containment pipeline sections having curvatures such as double containment fittings. Sometimes the primary pipeline section is impact damaged before or during the process of being slipped into the secondary pipeline section. If the primary pipeline section is made from a composite material, such damage may not be capable of being detected by the human eye. As a result, double containment pipeline sections formed using this method may be undetectably damaged from the onset.

To detect leakage of the primary pipeline section, a sump is generally placed at the lowest point of the pipeline. The sump is typically connected to a lower portion of the annulus formed between the primary and secondary pipeline sections. Any fluid leaked from the primary pipeline section will travel in the annulus and will collect in the sump. The sump is periodically monitored to determine if there has been leakage. A sensor may be placed in the sump for detecting the accumulation of fluids. A disadvantage with this leak monitoring approach is that it is not instantaneous, i.e., a leak from the primary pipeline section that is located far enough upstream from the sump would not be detected until the leaked fluid has traveled down the pipeline and into the sump.

During installation and initial inspection of double containment pipeline sections, leakage may be detected by visual inspection of the primary pipeline section. To accomplish this type of inspection, the secondary pipeline section is telescoped away from the primary pipeline section. This is also a time consuming, costly process.

Furthermore, the use of a continuous leak detection monitoring system that places a fluid, such as brine, in the annulus (or interstitial space) has been impractical and costly for double containment pipeline. In such monitoring systems, the interstitial space is filled with a fluid substance, such as brine, and connected to a fluid reservoir where the brine levels are monitored. This allows for continuous monitoring of leaks in both the primary and secondary pipeline sections because a leak in either would change the volume of fluid in the interstitial space and, thus, the fluid reservoir. The use of fluid for continuous monitoring has been practical in double-walled tanks, but not in pipeline systems. Unlike underground storage tanks that are assembled in factories, double containment pipeline systems must be assembled in the field, which makes filling the interstitial space with fluid difficult.

Additionally, known double containment pipeline sections having one pipeline section mounted over another pipeline section typically have a large interstitial space, which requires large volumes of fluid.

Another type of contained pipeline system that has been used for conveying fuel from tanks to dispensers is extruded, flexible hosing. Typically, in such contained systems the flexible hosing has a "coaxial" construction, wherein the primary layer and secondary layer are in close proximity. Although the coaxial construction lowers the volume of the interstitial space and the amount of brine required to fill the interstitial space, the material properties of flexible hoses are not stiff enough to resist the significant changes in volume that occur in the primary hose when it is under internal pressure (i.e. the diameter expands). This change in volume is a reason why a continuous monitoring leak detection system has been practical for underground storage tanks, but not for flexible hosing.

Underground storage tanks are typically filled with fuel and remain at atmospheric pressure. Therefore, no pressure differential exists between the tank interior and the interstitial space between the walls. In contrast, pipeline used for dispensing or transporting fuel from the underground storage tanks are typically operated with internal pressure on the interior pipeline section. The internal pressure changes, for example, when a submersible turbine pump (STP) located at the tank is turned on by a consumer at a fuel dispenser and when a nozzle at the dispenser is turned off when a full tank of gas is detected. The pressure change at the starting of the pump is typically approximately 30 psi, and the spike in pressure at the nozzle shut-off can be over 200 psi. Thus, the fuel dispensing pipeline sections must be able to withstand tremendous pressure. With respect to the flexible hosing, the primary layer cannot sufficiently withstand the high pressure changes without expanding under pressure, thus affecting the volume of the interstitial space. Therefore, although the coaxial construction of the flexible hosing has a low volume interstitial space, continuous monitoring of the interstitial space has been impractical and unreliable.

Furthermore, attempts to use continuous monitoring in double containment pipeline sections or coaxial flexible hoses have only been able to monitor the pipeline sections themselves and not the fittings that connect the pipeline sections. Rather, in such systems, where the pipeline sections are joined together by a fitting (which includes elbows, tees, etc.), the interstitial spaces of the two pipeline sections are not continuously joined and are not in fluid communication with each other. Instead, the fittings only maintain a continuous connection between the primary pipeline sections, and the interstitial spaces of the two pipeline sections are separately connected by some form of bypass hose, jumper device, or boot device. Therefore, known systems fail to maintain a continuous leak detection system for the entire system, including at the fittings.

Accordingly, there exists a need for a contained pipeline system with a double containment pipeline section having a coaxial construction that exhibits high strength and has a low volume interstitial space. Moreover, there exists a need for a system where the fittings that connect the various pipeline sections maintain a continuous connection between the primary pipeline sections and the secondary pipeline sections. Use of such pipeline sections and pipeline fittings would allow for a contained pipeline system where brine could be filled in the interstitial space to provide a continuous leak detection monitoring system of both the primary and secondary pipeline sections, as well as at the pipeline fittings.

SUMMARY OF THE INVENTION

The present contained pipeline system overcomes the above-described problems with existing contained pipeline systems. Specifically, there is provided a double containment pipeline system suitable for continuously monitoring and detecting leaks in both the primary and secondary pipeline sections throughout the entire pipeline system, including the pipeline fittings. A method is also provided for detecting leakage in the pipeline system.

An exemplary contained pipeline and leak detection system includes a plurality of pipeline sections adjoined together by pipeline fittings (including elbows, tees, and the like) and adjoined to one or more fluid reservoirs. Each pipeline section includes a primary pipeline section and a secondary pipeline section disposed around the primary pipeline section. An interstitial space having an interstitial volume is formed between the primary pipeline section and the secondary pipeline section. The fluid reservoir(s) has a volume of fluid disposed therein and is in fluid communication with the interstitial space of each pipeline section and the pipeline fittings.

A portion of the volume of fluid is disposed within the interstitial space, such that a change in the volume of the interstitial space changes the volume of fluid in the fluid reservoir. Changes in the volume of fluid in the fluid reservoir, and thus, the interstitial space, are detected by an alarm system installed within the fluid reservoir.

In an exemplary embodiment, the pipeline sections have a coaxial construction, and the distance between the primary pipeline section and the secondary pipeline section does not exceed about 1 mm. Furthermore, exemplary pipeline fittings adjoin pipeline sections together such that fluid communication is maintained between the primary pipeline sections, between the interstitial spaces, and between the secondary pipeline sections. A suitable fluid for use in the fluid reservoir and interstitial space is brine. The interstitial space includes a permeable layer that reduces the volume of the interstitial space, thereby reducing the volume of brine needed to occupy the interstitial space. This also reduces the required size of the fluid reservoir.

BRIEF DESCRIPTION OF THE DRAWINGS

FIG. 4b is a perspective side view of the contained pipeline system of FIG. 4a.

FIG. 4c is a perspective rear view of the contained pipeline system of FIG. 4a.

DETAILED DESCRIPTION

A contained pipeline system according to the present invention, generally includes a plurality of double containment pipeline sections, with each pipeline section having a primary (inner) pipeline section that is in close proximity with a secondary (outer) pipeline section, such that an annulus or interstitial space is formed therebetween and has a low interstitial volume. The contained pipeline sections preferably have a coaxial construction, however, it is understood that contained pipeline sections not having a coaxial construction may also be used, including those constructed by disposing a larger pipeline section over a smaller pipeline section (e.g., a 3-inch pipeline section over a 2-inch pipeline section).

The interstitial space is filled with a suitable fluid substance, such as brine or glycol. An exemplary double containment pipeline system includes several pipeline sections joined together by pipeline fittings (i.e., elbows, tees, clamshells, and the like) and connected to one or more fluid reservoirs, which allows the fluid levels within the interstitial spaces of the pipeline sections and within the pipeline fittings to be continuously and instantaneously monitored. If the primary pipeline section leaks, then the fluid levels within the interstitial space and fluid reservoir are increased. Likewise, if the secondary pipeline section leaks, then the fluid levels within the interstitial space and fluid reservoir are decreased.

Figure 1:
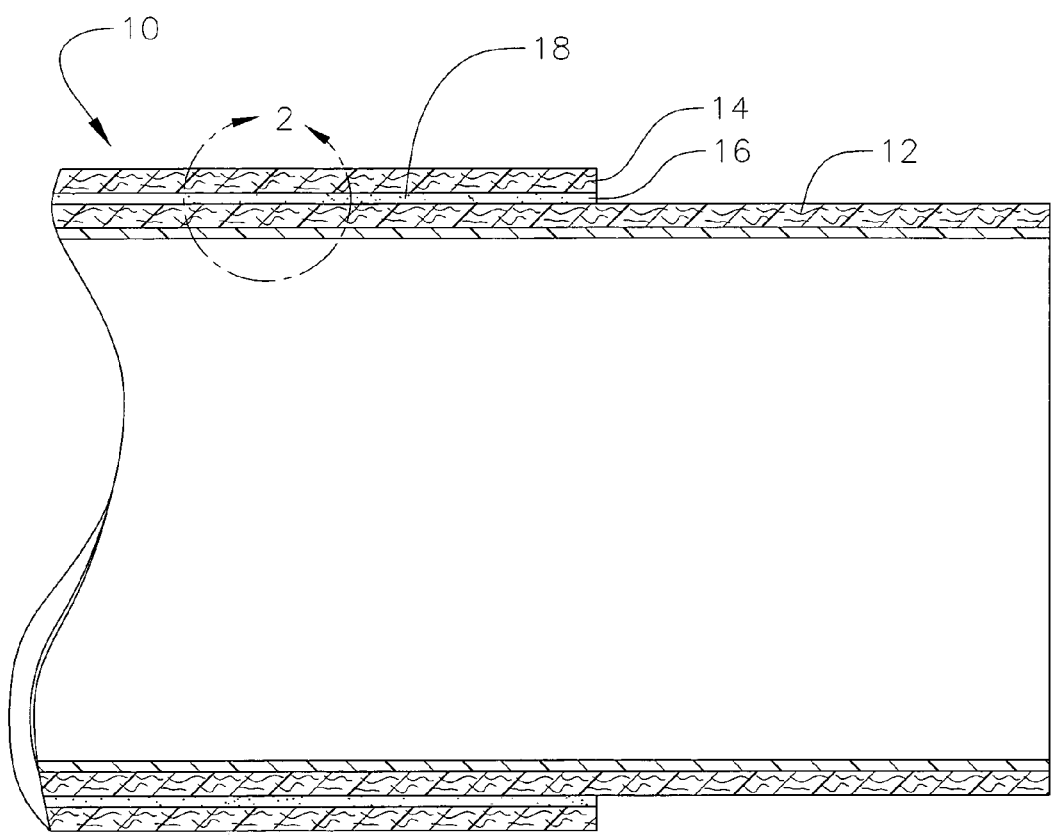
FIG. 1 is a cross sectional view of a double containment pipeline section having sand defining the interstitial space between the primary and secondary pipeline sections.

The double containment pipeline system of this invention comprises a plurality of pipeline sections 10. An exemplary double containment pipeline section is disclosed in U.S. Pat. No. 6,026,862 to Friedrich et al. entitled "Double Containment Pipe Sections," which is incorporated herein by reference in its entirety. FIG. 1 shows an exemplary double containment pipeline section 10, which comprises a primary pipeline section 12 within a secondary pipeline section 14.

Figure 3:
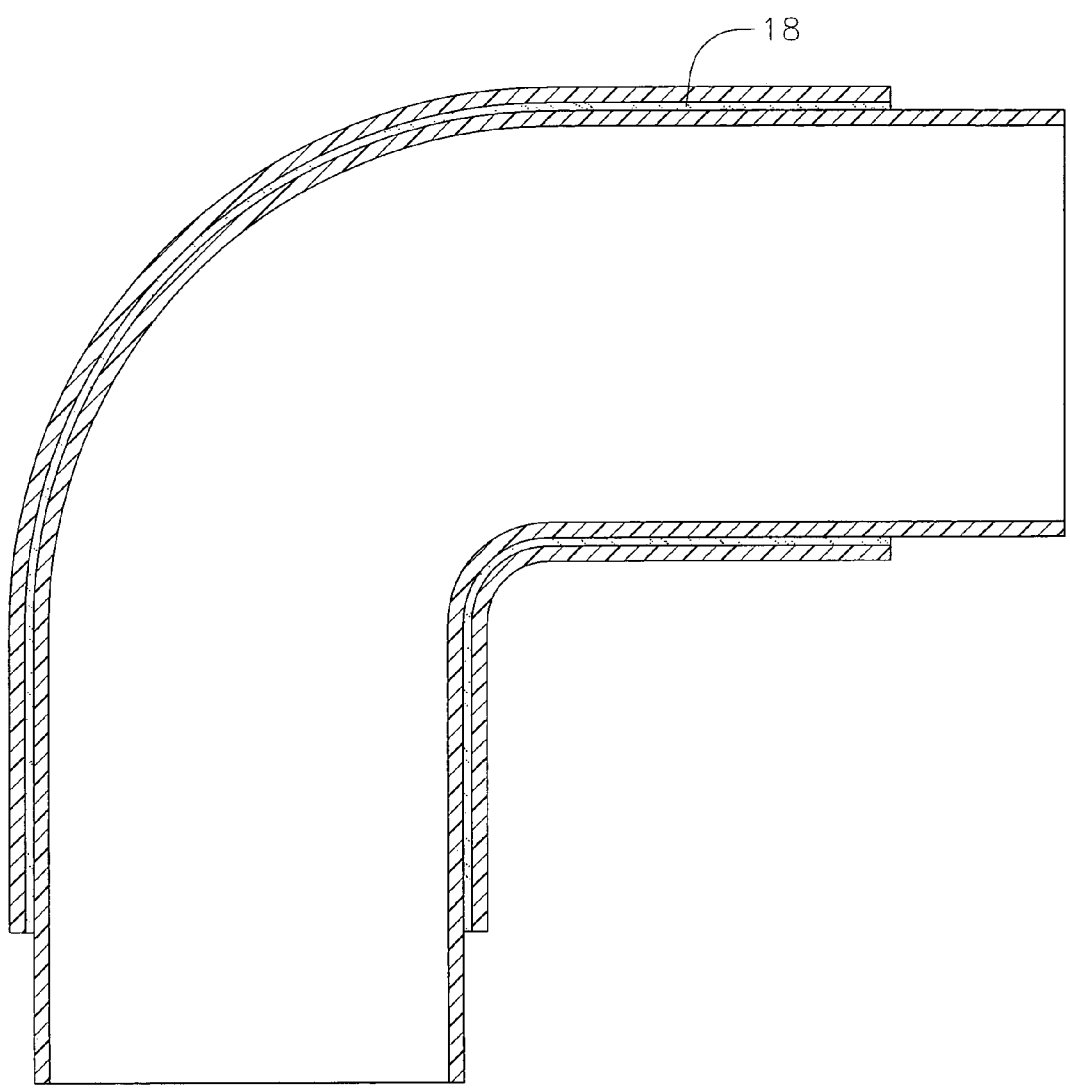
FIG. 3 is a cross sectional view of a double containment pipeline fitting.

The purpose of the secondary pipeline section 14 is to contain any leakage from the primary pipeline section 10, and to assist in the detection of such leakage. The description of the pipeline sections 10 are intended to apply to various configurations of pipeline sections, as well as various fittings used to interconnect pipeline sections. For example, an elbow is shown in FIG. 3 having the same general construction as the pipeline section in FIG. 1. The pipeline fittings that directly connect two or more pipeline sections are often referred to as primary fittings, which include elbows and tees. Other pipeline fittings that may not directly connect the primary pipeline sections, but do connect the secondary pipeline sections, or at least provide containment around the connections achieved by the primary fittings, are often referred to as containment fittings. An exemplary containment fitting is a clamshell fitting (shown in FIG. 5 and discussed below), which has a pair of clamshell halves that are placed over pipeline fittings and/or the pipeline sections being connected by the fittings.

An annulus or interstitial space 16 is formed between the primary pipeline section 12 and the secondary pipeline section 14. In an exemplary embodiment, the radial thickness of the interstitial space (i.e. the distance between the outer surface of the primary pipeline section and the inner surface of the secondary pipeline section) is not greater than about one millimeter. The interstitial space can contain a permeable layer 18 that can be formed from a granular material such as sand. The granular material serves as a spacer between the primary pipeline section and secondary pipeline section, and defines the interstitial space. Since the granular material forms the permeable layer, it allows for the placement and flow of a fluid substance, such as brine or glycol, for use in a continuous leak detection monitoring system. Furthermore, the permeability of the interstitial space allows for flow of any leaks from the primary pipeline section, and requires less fluid to fill the interstitial space.

Figure 2:
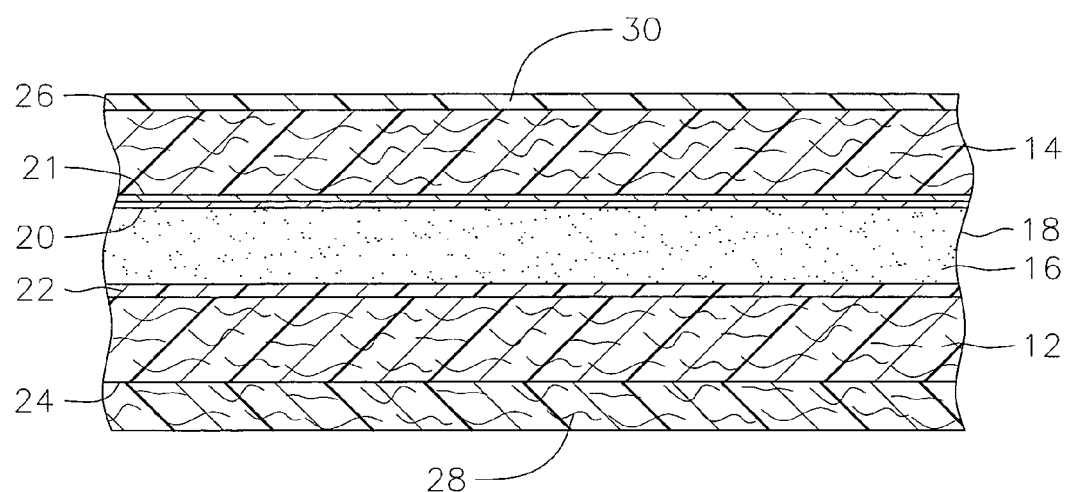
FIG. 2 is an expanded cross sectional view of a section of the double containment pipeline section shown in FIG. 1.

To form the exemplary pipeline sections 10, a primary pipeline section 12 is wrapped with a plastic tape 20 having a permeable layer 18 of sand on one of its faces (FIG. 2). The tape can be made from polyvinyl fluoride "PVF", polyethylene "PE", polypropylene "PP" or any other suitable material. The tape has a tacky adhesive on one of its faces. A layer of sand can be applied on the face of the tape having the adhesive, by pulling the tape through a container of sand. The tape is then wrapped around the primary pipeline section such that the sand is sandwiched between the outer surface of the primary pipeline section and the plastic tape on to which it is adhered, thereby defining the permeable layer.

A second tape layer 21 is then wrapped around the taped primary pipeline section. The secondary pipeline section is then wound over the taped primary pipeline section. This can be accomplished by winding layers of glass fibers embedded in resin, such as epoxy, over the taped primary pipeline section. The second plastic tape layer prevents the permeation of the resin into the interstitial space occupied by the layer of sand. Such permeation would result in blockage of the interstitial space. The second plastic layer also prevents air from getting into the secondary pipeline section during curing. The wound secondary pipeline section is then cured forming the double containment/pipeline section.

In a further exemplary embodiment, the first tape layer is wrapped around the primary pipeline section with the sand facing away from the primary pipeline section. A second and possibly a third tape layer are then wrapped over the exposed sand followed by winding of the secondary pipeline section.

While in the exemplary embodiments, the permeable layer 18 is formed by a granular material such as sand, other permeable materials may also be used. For example, instead of using a tape having sand adhered to one of its faces, a mesh material such as a copper mesh or cloth may be used. The mesh used may be woven or non-woven and may be formed from conductive or non-conductive wires or fibers. With these embodiments, the interstitial space 16 of the double containment pipeline section will contain the mesh material. The mesh may be in tape form to allow for wrapping around the primary pipeline section, especially in a continuous manufacturing process. If the primary pipeline section is in a wet condition (i.e., not cured) a plastic tape layer can be wrapped around the primary pipeline section prior to the wrapping of the mesh. Similarly, a plastic tape layer can be wrapped over the mesh prior to the winding of the secondary pipeline section. The plastic tape layers create a seal for preventing resin from penetrating the mesh, and air from the mesh from penetrating the resin.

The exemplary embodiments described herein can be easily incorporated into current pipeline manufacturing systems that form pipeline sections, such as by winding glass fibers embedded in resin. Similarly, these embodiments may be incorporated in manufacturing systems that manufacture a continuous section of pipeline by laying longitudinal glass fibers embedded in resin which are wrapped with other glass fibers embedded in resin. Incorporation of these embodiments may be accomplished by adding extra steps to these manufacturing systems to wrap the plastic tape layers, with or without sand or mesh, and to wind the secondary pipeline section. Further, many types of resins can be used for forming either the primary or secondary pipeline section, such as epoxy, polyester, vinyl ester, phenolic, or furan. Moreover, an inner surface 24 of the primary pipeline section and an outer surface 26 of the secondary pipeline section may be coated with protective coatings 28, 30 for protection against the environments to which they are exposed.

Figure 4A:
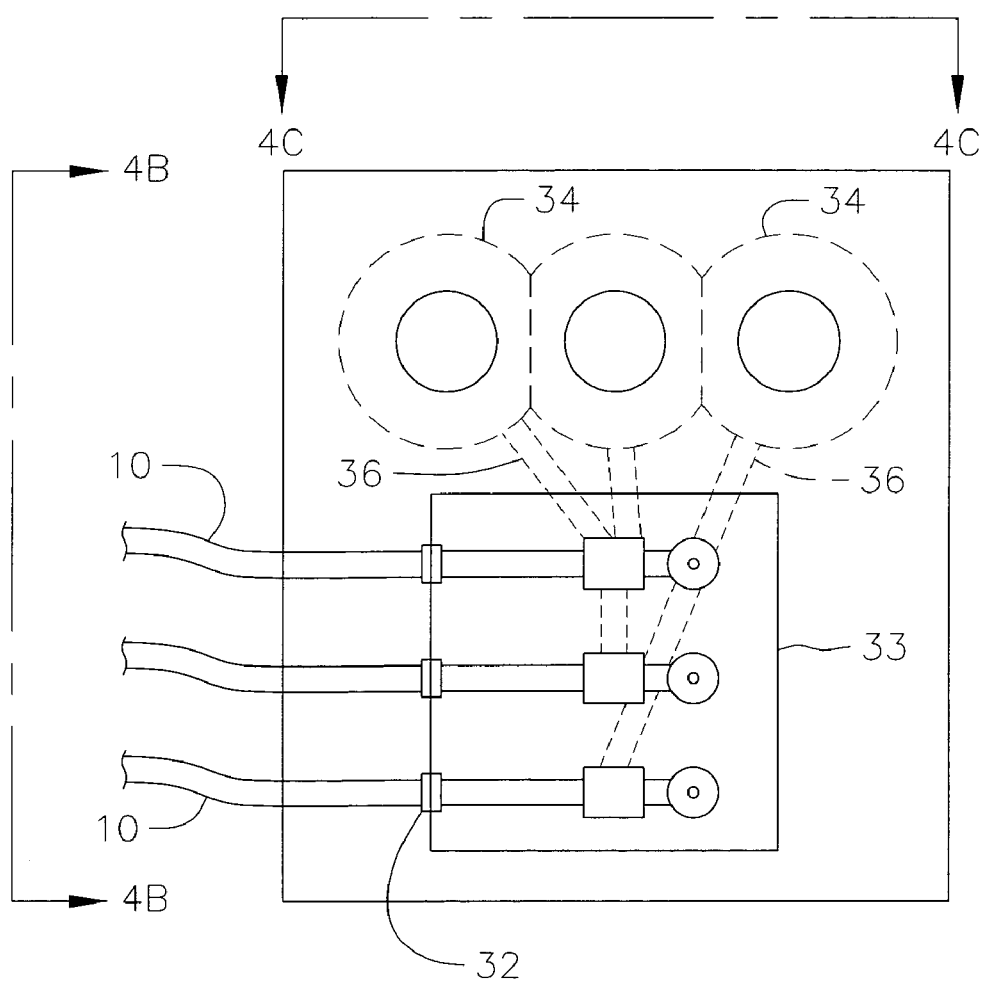
FIG. 4a is a perspective top view of a contained pipeline system having an exemplary continuous leak detection system.
Figure 4B:
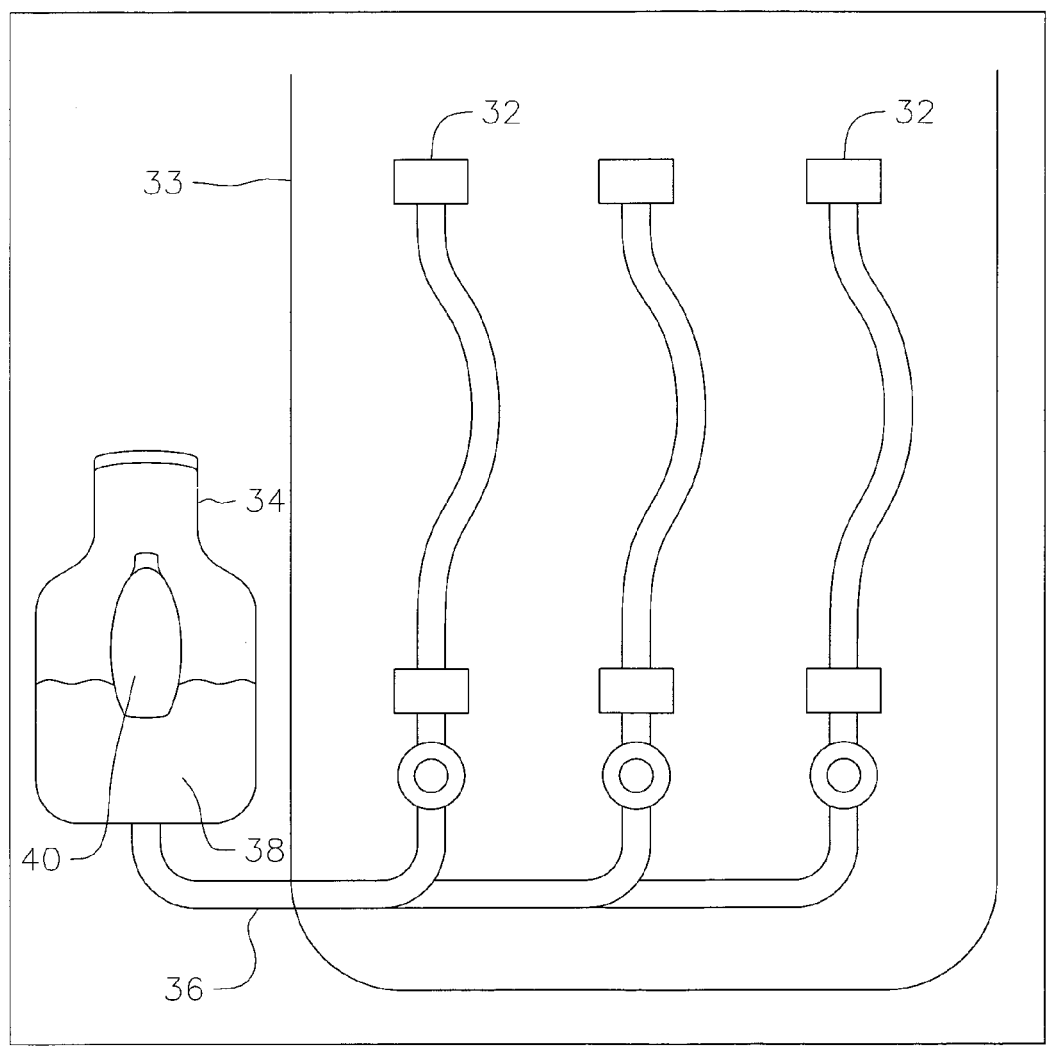
Figure 4C:
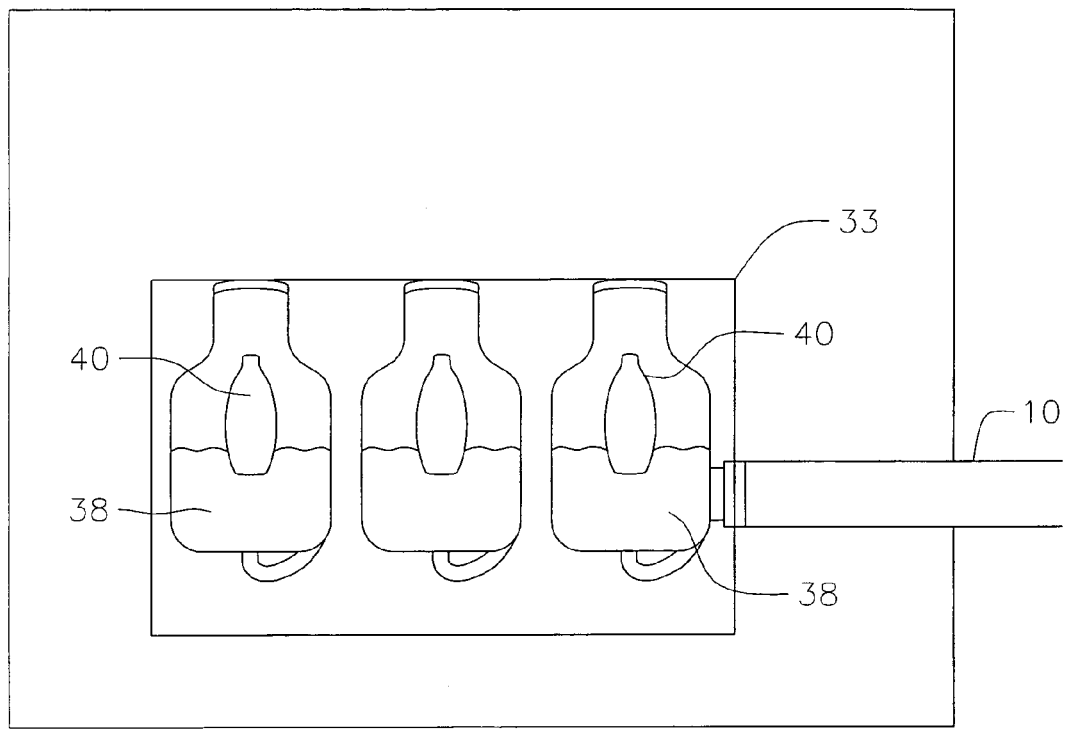

One exemplary configuration of the contained pipeline system having a continuous leak detection monitoring system is shown in FIGS. 4a to 4c. The exemplary system shown comprises three pipelines leading to fuel dispensers 32 positioned within a dispenser sump 33, and each of the pipelines leading to fuel dispensers is adjoined to an underground storage tank (not shown) and a fluid reservoir 34. Each of the pipelines leading to fuel dispensers 32 is connected to the underground storage tank by a pipeline section 10, which may include multiple pipeline sections adjoined together by pipeline fittings (not shown). Each of the three pipeline sections 10 is separately adjoined to one of the fluid reservoirs 34 by reservoir hoses 36, which allows a leak in any of the pipeline sections to be individually identified. It is possible, however, to have more than one pipeline section connected to a single fluid reservoir. The reservoir hoses 36 provide fluid communication between the fluid reservoirs 34 and the pipeline sections 10.

The fluid reservoirs contain a specified volume of fluid 38, which in the exemplary embodiment is brine. The pipeline sections 10 also have a specified volume of brine 38 disposed within the interstitial space 16 of each of the pipeline sections. The volume of brine disposed within the interstitial spaces of the pipeline sections does not generally change, which allows for reliable leak detection monitoring. The fluid communication between the interstitial space and the fluid reservoir indicates any leaks in the primary or secondary pipeline sections. For example, a leak in the primary pipeline section would cause fluid to enter the interstitial space and to increase the volume of fluid in the fluid reservoir. Similarly, a leak in the secondary pipeline section would cause fluid to exit the interstitial space and to decrease the volume of fluid in the fluid reservoir; and in some cases, a leak in the secondary pipeline section could allow an outside fluid source, such as ground water, to enter the interstitial space and increase the volume of fluid in the fluid reservoir.

The ability to continuously monitor the entire pipeline system is achieved by using pipeline fittings that adjoin the pipeline sections and maintain a fluid communication between the primary pipeline sections, between the interstitial spaces, and between the secondary pipeline sections. Unlike previous double containment pipeline systems, the present pipeline system allows for continuous monitoring of the entire system, including the pipeline fittings, by not breaking the connection between the interstitial space of adjoining pipeline sections. As described above, previous systems have only used fittings that directly connect the primary pipeline sections, and the interstitial spaces and secondary pipeline sections are indirectly connected by a separate device such as a jumper hose or boot connector. Such systems have the disadvantage of not being able to detect leaks in the pipeline fittings because the interstitial spaces do not run through the pipeline fittings.

Figure 5:
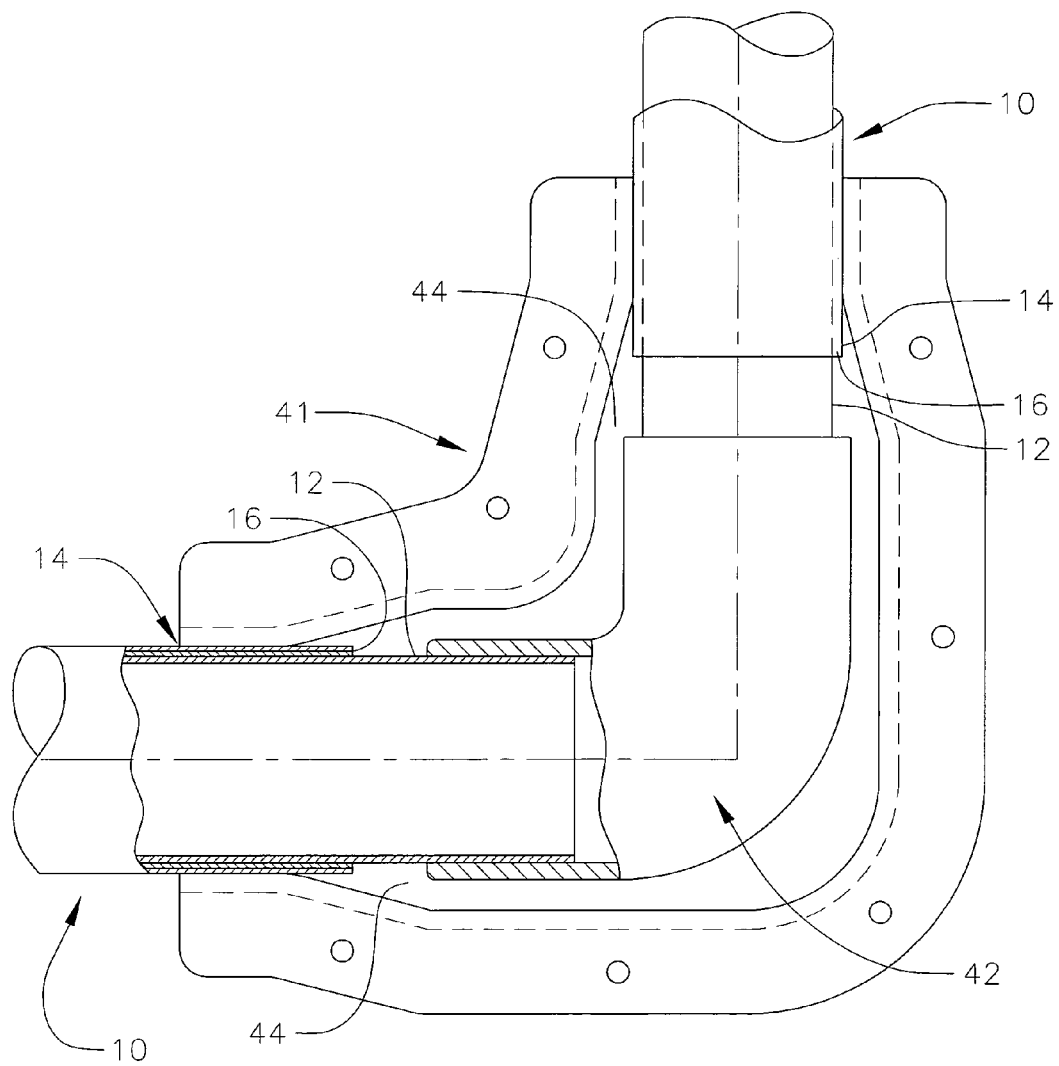
FIG. 5 is a partial cross-sectional view of a pair of pipeline sections adjoined by an elbow and a containment clamshell fitting.

An exemplary pipeline fitting for continuously monitoring the entire pipeline system is shown in FIG. 5, which shows a clamshell fitting 41 being used to adjoin two pipeline sections 10. More specifically, FIG. 5 shows one half of the clamshell fitting 41 disposed around two pipeline sections 10 that are interconnected by an elbow 42. In this configuration, the elbow 42 is the primary fitting that directly joins the primary pipeline sections 12 of the two pipeline sections. The clamshell fitting 41 is the containment fitting that serves to contain the volume of fluid that passes through the interstitial spaces of the two pipeline sections 10, and therefore, also serves as direct connection for the interstitial spaces 16 and the second pipeline sections 14 of the two pipeline sections.

Each of the pipeline sections 10 shown in FIG. 5 has a portion of the secondary pipeline section 12 cut-back to allow for bonding with the elbow 42. The clamshell fitting 40 envelopes the elbow (i.e., the primary fitting) and directly contacts the secondary pipeline sections. Interior surfaces 43 of the clamshell fitting adjoin to exterior surfaces of the secondary pipeline sections such that an annulus 44 is created therebetween. More specifically, the annulus 44 provides a path for fluid within the interstitial spaces 16 of the pipeline sections to flow through the clamshell fitting and, thus, maintain continuous fluid communication between the interstitial spaces of the adjoined pipeline sections. Consequently, the annulus 44 of the clamshell fitting is in fluid communication with the brine reservoir and a leak can be continuously detected throughout the entire pipeline system, including the fittings and secondary pipeline sections. The clamshell fitting can be made from any suitable material, such as rigid composite materials that are used in fluid transport pipelines.

Although the use of brine has been specifically described, it is understood that other types of fluids, such as glycol and the like, can be used depending on the particular application. Brine is suitable because of its resistance to freezing and its chemical inertness to fiberglass pipeline materials.

Referring to FIGS. 4a to 4c, each of the fluid reservoirs 34 is equipped with one or more sensors 40 that monitor changes of volume in the reservoirs and, thus, within the interstitial spaces 16 in the pipeline sections. The sensors can be any suitable type, including magnetic float types. An exemplary system of leak detection includes a two-level alarm system that is activated by the sensors 40.

A high level alarm caused by a rise in the brine in the fluid reservoir would indicate a breach in the primary pipeline section and that fluid (such as fuel) is entering the interstitial space from the primary pipeline section and, thus, causing the brine level in the fluid reservoir to rise. The high level alarm could also indicate a breach in the secondary pipeline section and that the secondary pipeline section is allowing an exterior substance (such as ground water) to enter into the system (this is a less likely occurrence). A low level alarm caused by a decrease in the brine level in the fluid reservoir would indicate a breach in the secondary pipeline section and that fluid (brine) was leaking from the interstitial space through the secondary pipeline section and, thus, causing the brine level in the fluid reservoir to fall. No alarm would indicate that each component of the system was intact and without leaks. It is understood that a single sensor could be used to detect a rise and/or a fall within the fluid reservoir.

Because the primary pipeline section and secondary pipeline section preferably form an integral unit with a small interstitial space, the exemplary contained pipeline system allows for faster leak detection, and makes the use of brine more practical. The volume of brine necessary to fill the interstitial space is significantly reduced by using the above-described double containment pipeline. For example, a 2-inch pipeline section made according to the exemplary pipeline section has an interstitial volume of approximately one gallon per 82 feet of pipeline. Therefore, for a pipeline run of approximately 200 feet, less than 3 gallons of brine would be needed to fill the interstitial space. In comparison, a double containment pipeline constructed by having a 3-inch pipeline section disposed over a 2-inch pipeline section would require approximately 20 gallons of brine for the same length. While it is understood that the present system can include such double containment pipeline sections (i.e. 3-inch over 2-inch), the exemplary pipelines having a coaxial construction require substantially less brine.

Concerning the fluid reservoirs, it is preferred that the reservoirs be located within the dispenser sump. Because the reservoirs do not need to be very large in size, particularly when using double containment pipeline sections with low interstitial volume, it is feasible to place the reservoirs directly into the sump.

Figure 6:
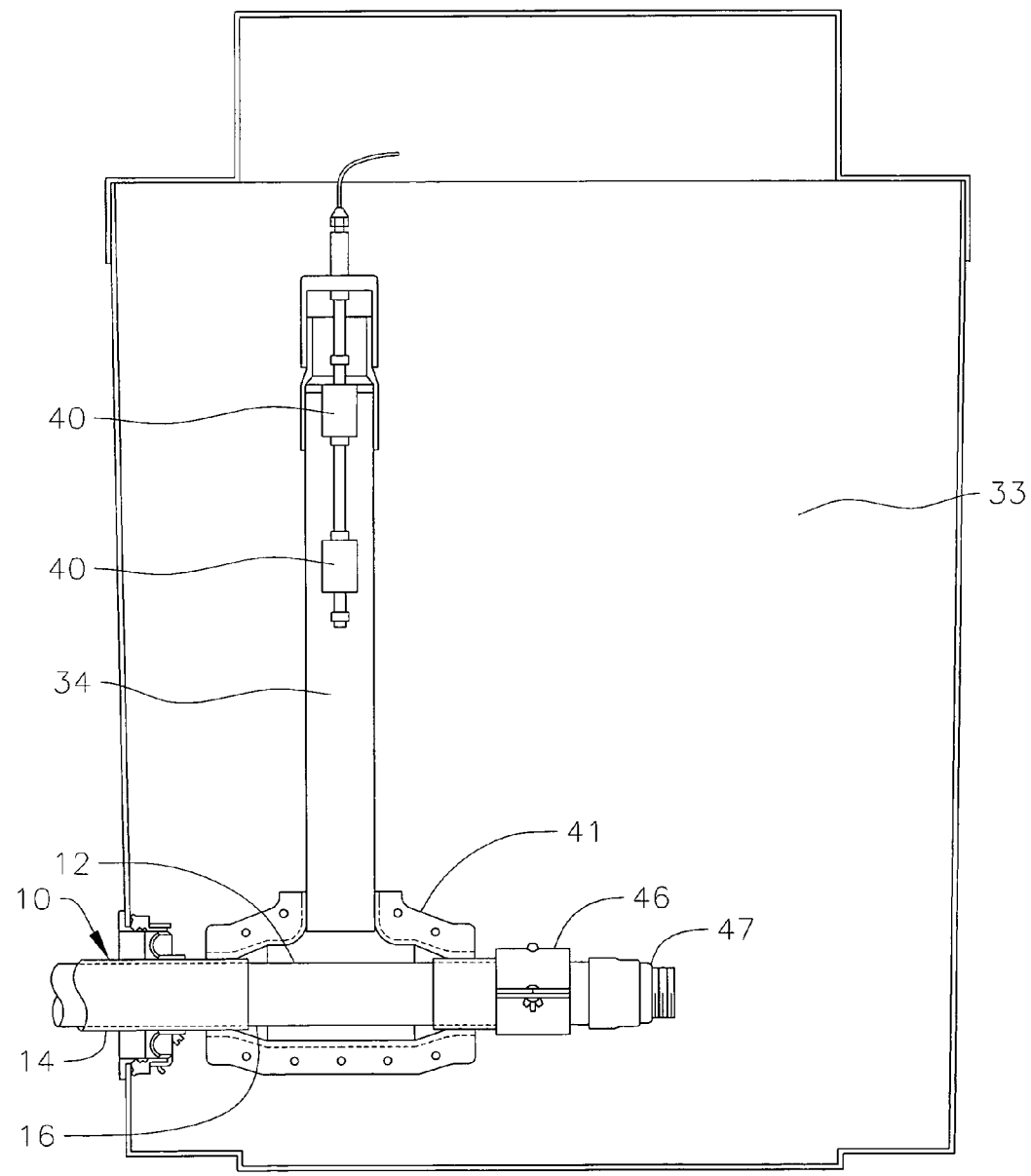
FIG. 6 is a partial cross-sectional view of a fluid reservoir mounted within a containment sump.

An example of the reservoir 34 positioned within the sump 33 is shown in FIG. 6. More specifically, a pipeline section 10 is adjoined to a termination assembly 46 by a clamshell fitting 41. The clamshell fitting connects to the secondary pipeline section 14. A termination fitting 46 is, in the exemplary embodiment, connected to the outer surface of the secondary pipeline section and the outer surface of the primary pipeline section, and thereby terminates the interstitial space and the flow of fluid therein. The primary pipeline section 12 extends past the termination fitting 46 and into a connector fitting 47. The connector fitting adjoins the primary pipeline section to a dispenser (not shown) for dispensing the fluid within the primary pipeline section. In this configuration, the interstitial space 16 between the primary pipeline section and the secondary pipeline section is in fluid communication with the clamshell fitting 41. The clamshell fitting is also connected to a fluid reservoir 34, which has an opening that allows the fluid flowing in the interstitial space of the pipeline section 10 to pass through the clamshell fitting and into the fluid reservoir. Thus, the fluid reservoir is in fluid communication with the interstitial space of the pipeline section, such that sensors 40 positioned within the fluid reservoir detect changes in the fluid level within the interstitial space, and thus, detect any leaks in the pipeline section(s).

Equipment for constructing the present contained pipeline system is already available. No new technology is needed, and practical location of the fluid reservoirs and pipeline sections for the system can be determined on a site specific basis.

The accuracy of the sensors and fluid reservoirs should not be impacted by pressure and temperature changes experienced by the pipeline sections because the exemplary pipeline sections are constructed to withstand such changes. Several advantages are gained by use of a coaxial pipeline section having a permeable layer (such as sand) between the primary pipeline section and secondary pipeline section. If the primary pipeline section expands under internal pressure, the sand forces the secondary pipeline section to expand the same amount. This dramatically limits the change in volume of the interstitial space, and reduces the number of false alarms that would result from pressure changes in other systems (e.g., flexible hosing).

Also, in most conventional dual containment pipeline systems, the primary pipeline section is loosely positioned inside the secondary pipeline section. Accordingly, pressure and resulting diameter changes in the primary pipeline section do not effect diameter changes in the secondary pipeline section, so larger changes in interstitial volume occur. This significantly increases the size of the reservoir required for the system.

The small reservoir that results from the exemplary pipeline system also has economic advantages because the reservoir can be made small enough to fit inside the existing sump under the dispensers. This eliminates the additional expense in construction and installation (i.e., extra fittings, hoses to connect to the reservoir, extra sumps under the reservoirs, covers, etc.) required with a separate reservoir outside of the sump.

In addition to the specific features and embodiments described above, it is understood that the present invention includes all equivalents to the structures and features described herein, and is not to be limited to the disclosed embodiments. For example, the size and volume of interstitial space can be varied, as can the general construction of the double containment pipeline sections. Additionally, individuals skilled in the art to which the present contained pipeline system pertains will understand that variations and modifications to the embodiments described can be used beneficially without departing from the scope of the invention.

What is claimed is:

1. A pipeline system comprising:
    a first pipeline section having a first secondary pipeline section disposed around a first primary pipeline section, wherein a first interstitial space is formed between the first secondary pipeline section and the first primary pipeline section;
    a second pipeline section having a second secondary pipeline section disposed around a second primary pipeline section, wherein a second interstitial space is formed between the second secondary pipeline section and the second primary pipeline section, wherein the first primary pipeline section is coupled to the second primary pipeline section;
    a fitting coupling the first secondary pipeline section and the second secondary pipeline section, wherein an annulus is defined between the fitting and the coupled primary pipeline sections, and wherein the first and second interstitial spaces are in fluid communication with the annulus;
    a fluid reservoir having a volume of fluid, wherein the annulus and the first and second interstitial spaces are filled with the fluid such that fluid entering or exiting the first and second interstitial spaces and the annulus changes the volume of fluid in the fluid reservoir; and
    a sensor for detecting changes in the volume of fluid in the fluid reservoir.

2. The pipeline system of claim 1, wherein the first and second interstitial spaces have a thickness not exceeding about 1 mm.

3. The pipeline system of claim 1, wherein the fluid is brine.

4. The pipeline system of claim 1, wherein the secondary pipeline sections are 3-inch pipeline sections and the primary pipeline sections are 2-inch pipeline sections.

5. The pipeline system of claim 1 wherein the fitting is a clamshell fitting.

6. The pipeline system of claim 1 wherein the sensor is a two-level alarm system that provides an alarm at a first level when the volume of fluid in the fluid reservoir has increased to a first predetermined amount, and provides an alarm at a second level when the volume of fluid in the fluid reservoir has decreased to a second predetermined amount.

7. The contained pipeline system of claim 1 wherein the interstitial spaces comprise a permeable layer that reduces the volume of the interstitial spaces that can be occupied by the fluid from the fluid reservoir.

8. The contained pipeline system of claim 7 wherein the permeable layer comprises a granular material.

9. The contained pipeline system of claim 8 wherein the first pipeline section has a diameter of two inches, and an interstitial volume of approximately one gallon per 82 feet of length.

10. The contained pipeline system of claim 7 wherein the permeable layer comprises a mesh material.

11. The contained pipeline system of claim 1 wherein the fluid reservoir is coupled to the fitting such that the fluid reservoir is in fluid communication with the annulus.

12. The contained pipeline system of claim 11 wherein the fluid is introduced to the pipeline system through the fitting.

13. A method of monitoring a contained pipeline system having a first pipeline section and a second pipeline section, each having a secondary portion disposed around a primary portion and defining an interstitial space therebetween, and the primary portions of the pipeline sections coupled to each other, and the secondary portions of the pipeline sections coupled to each other by a fitting, such that an annulus is defined between the fitting and the coupled primary portions, the method comprising:
    providing a fluid reservoir having a volume of fluid;
    supplying the fluid from the fluid reservoir into the interstitial spaces and the annulus, wherein the interstitial spaces and the annulus are in fluid communication with the fluid reservoir; and
    detecting a leakage in the primary portions, the secondary portions, the coupling of the primary portions, and the fitting by monitoring the volume of fluid in the fluid reservoir.

14. The method of claim 13 further comprising activating an alarm system when changes in the volume of fluid in the fluid reservoir are detected.

15. The method of claim 14 wherein the alarm system is a two-level alarm system that provides an alarm at a first level when the volume of fluid in the fluid reservoir has increased to a first predetermined amount, and provides an alarm at a second level when the volume of fluid in the fluid reservoir has decreased to a second predetermined amount.

16. The method of claim 13 wherein a leak in the primary portions results in an increase in the volume of fluid in the fluid reservoir.

17. The method of claim 13 wherein a leak in the secondary portions or the fitting results in a decrease in the volume of fluid within the fluid reservoir.

* * * * *